3,776,878
ADDITIVE FOR ACRYLIC LACQUERS

Martin J. Simon, Natrona Heights, Pa., assignor to PPG Industries Inc., Pittsburgh, Pa.
No Drawing. Filed Jan. 4, 1971, Ser. No. 103,917
Int. Cl. C08f 45/36
U.S. Cl. 260—32.2    9 Claims

ABSTRACT OF THE DISCLOSURE

Acrylic lacquers containing acrylic polymers when used as coatings exhibit excellent gloss and pattern control when methyl 12-hydroxystearate is used as an additive. The additive may be used for both solvent solutions and dispersions of acrylic polymers.

---

There are many fields in which it is desirous to have acrylic lacquer topcoats for purposes of protection and for aesthetic reasons. Acrylic lacquers which are used for these purposes are generally solutions of acrylic polymer in a solvent for the polymer along with the plasticizer. The conventional method of applying these acrylic topcoats is by spraying.

The acrylic lacquers are generally pigmented and after plasticizer has been added to act as a carrier for the pigments, if present, and, as a coalescent for the polymer, the acrylic lacquer may be coated on to the substrate in any conventional manner, preferably by thinning with a solvent thinner and spraying.

It has been necessary, however, to add large amounts of cellulosic materials such as from about 20 to about 30 percent by weight of cellulose acetate butyrate or nitrocellulose to the acrylic solution to improve the metallic orientation. The use of these materials has proven to be quite expensive.

It has now been found that the use of relatively small amounts of methyl 12-hydroxystearate as an inexpensive additive to paint compositions containing acrylic polymer solutions greatly improves the metallic orientation of the paint composition in the absence of cellulosic materials.

By "acrylic polymer" is meant a polymer of an ester or amide of acrylic or methacrylic acid or a copolymer of such an ester with another copolymerizable monomer. Suitable esters include those of alcohols containing 1–8 carbon atoms, such as methyl acrylate, methyl methacrylate, ethyl acrylate, n-butyl methacrylate, octyl acrylate, and 2-ethoxy-ethyl methacrylate. Suitable amides include acrylamide, methacrylamide, tertiary butyl acrylamide and primary alkyl acrylamides. Mixtures of such esters or amides may be copolymerized or one or more of the esters may be copolymerized with a higher alkyl ester or amide of acrylic or methacrylic acid or with another monomer containing a copolymerizable vinyl group, e.g., itaconate esters, maleate esters and allyl compounds. The preferable acrylic polymers in this invention are the alkyl methacrylates and, more specifically, poly(methyl methacrylate).

The acrylic lacquers which are solutions of acrylic polymers in solvent are formed by polymerizing the acrylic monomers described above in an active solvent for the polymerized monomer and adding plasticizers and pigments if desired. Examples of active solvents for acrylic polymers are ethoxyethylacetate (Cellosolve acetate), 2,2,4-trimethyl-1,3-pentanediol monoisobutyrate, acetone, toluene, methyl ethyl ketone, methyl isobutyl ketone, methyl isoamyl ketone, and the like.

The polymerization in this case is generally carried out in the presence of a free-radical producing catalyst. Benzoyl peroxide, cumene hydroperoxide, and similar peroxidic catalysts can be used, as can azo compounds such as azo-bis (isobutyronitrile) or other compounds which produce free-radicals at the conditions of reaction. Suitable additives, including chain-stopping agents may be utilized.

One or more co-monomers may be interpolymerized with the acrylic monomer although the amount of such other monomers included ordinarily is not more than about 30 percent of the total weight of the interpolymer. Such other monomers may be vinyl aromatic hydrocarbons, such as styrene and vinyl toluene; ethyl acrylate, butyl acrylate, 2-ethylhexyl acrylate and other esters of acrylic acid with alcohols having 1 to 18 or more carbon atoms; other methacrylic acid esters esters of higher alcohols having up to 20 carbon atoms; unsaturated nitriles, such as acrylonitrile or methacrylonitrile; or other copolymerizable vinyl monomers. In some cases, hydroxyalkyl or other substituted alkyl esters are utilized, such as, for example, hydroxyethyl acrylate, hydroxypropyl acrylate, hydroxyethyl methacrylate, hydroxyethyl hydrogen maleate, bis(hydroxypropyl) fumarate, 2 - aminoethyl methacrylate, glycidyl methacrylate, and the like. It is preferred to use internal plasticizers such as 2-ethyl hexyl acrylate, butyl acrylate, and ethyl acrylate as co-monomers to be copolymerized as this would eliminate the need for external plasticizers.

Some conventional external plasticizers commonly used for acrylic solutions have been dibutyl phthalate, butyl benzyl phthalate, diisooctyl phthalate, decyl butyl phthalate, diisooctyl adipate, dibutyl sebacate, butyl benzoate, triisooctyl trimellitate, n-octyl n-decyl trimellitate, and tricresyl phosphate. A particularly popular plasticizer for these purposes is a mixture of di-(methylcyclohexyl)-phthalate and methylcyclohexylisobutyl phthalate. In the paint composition of this invention, the physical properties are greatly improved over the properties of paint compositions containing the above plasticizers and the acrylic polymer solutions which are internally plasticized only by the addition of methyl 12-hydroxystearate.

If pigments are added, they may be dispersed in the acrylic polymer solution by grinding the pigments in a suitable medium and adding in the form of a paste. Examples of pigments commonly used are carbon black, iron oxide, and colloidal dispersions of hydrated iron oxides, phthalo blue, phthalo green, aluminum flake, chrome yellow, quinacridone red, $TiO_2$, and indanthrene yellow and indanthrene orange.

When the polymerization is complete; the acrylic polymer solution if not internally plasticized is admixed with an external plasticizer and a thinner is added, if it is desired to spray the coating onto a substrate. The thinner generally comprises a two component system, one component of which is an active solvent for the acrylic polymer and the second component being an aliphatic hydrocarbon. Examples of active solvents are ethoxyethyl acetate, (Cellosolve acetate), 2,2,4-trimethyl-1,3-pentanediol monoisobutyrate, acetone, toluene, methyl ethyl ketone, methyl isobutyl ketone, methyl isoamyl ketone, and the like. Some examples of liquid aliphatic hydrocarbons are hexane, heptane, octane, nonane, pentane, and the like.

The amount of methyl 12-hydroxystearate used may be varied over a broad range. Generally it is preferred that the acrylic lacquer contains from about 5 percent to about 35 percent by weight of the conventional plasticizer based on the weight of the polymer and from about 2 to about 15 percent by weight of the methyl 12-hydroxystearate additive. If the acrylic polymer is internally plasticized, the same amount of methyl 12-hydroxystearate is used.

The plasticized acrylic polymer solution may be used as a coating for all types of substrates. Preferably, the paint composition is thinned and sprayed onto the substrate to be coated but the polymeric composition may be applied in any conventional manner such as dip coating, roll coating, etc.

The coating compositions described may be used as coatings for both primed and unprimed metals such as aluminum and steel. They are especially useful as topcoats for automotive products. Automotive bodies spray-coated with these compositions have glossy coatings which are quite durable.

Coatings prepared using the methyl 12-hydroxystearate as an additive exhibit excellent gloss and a smooth coating of fine color and appearance. The use of methyl 12-hydroxystearate is of great value if a metallic finish is desired (metallic pigment such as aluminum is used). The use of metallic finishes generally involves serious metallic orientation problems if a cellulosic additive is not used. That is, the pattern of coating formed is non-uniform and mottled. The use of methyl 12-hydroxystearate produces greatly improved metallic orientation over the same coatings containing no additive for pattern control.

New plasticizers for acrylic polymer solutions such as 2,2,4-trimethyl-1,3-pentanediol dibenzoate may also be used with the novel additives of this invention.

The following examples set forth specific embodiments of the instant invention. However, the invention is not to be construed as being limited to these embodiments for there are, of course, numerous possible variations and modifications. All parts and percentages in the examples as well as throughout the specification are by weight unless otherwise indicated.

EXAMPLE 1

A solution acrylic lacquer containing methyl 12-hydroxystearate as an additive was prepared as follows:

A light blue metallic pigment paste was prepared comprising 19.5 parts of aluminum powder, 2.2 parts of phthalo blue pigment, 15.2 parts of an acrylic polymer solution and 63.1 parts of a 50 percent methyl ethyl ketone 50 percent toluene solution. The acrylic polymer solution used comprised 78 percent methyl methacrylate, 19.8 percent butyl methacrylate and 1.5 percent 2-(2-hydroxyethylamino) ethyl methacrylate. The polymer solids were 35 percent in a solvent mixture comprising 77 percent toluene and 23 percent acetone.

To 14 parts of the above pigment paste were added 193 parts of a composition comprising 90 percent methyl methacrylate and 10 percent 2-ethyl hexyl acrylate (internal plasticizer), 10 parts of methyl 12-hydroxystearate, and 105 parts of a solvent solution of 40 percent toluene, 32 percent VM&P naphtha, 20 percent methyl ethyl ketone, and 8 percent xylene.

The resulting acrylic polymer lacquer had excellent glass and coating pattern when coated onto a panel.

EXAMPLE 2

A solution acrylic lacquer containing methyl 12-hydroxystearate as an additive was prepared as follows:

A lacquer was prepared by adding 14 parts of the pigment paste described in Example 1 to 252 parts of a composition comprising 59.25 percent methyl methacrylate, 30 percent butyl methacrylate, 10 percent 2-ethyl hexyl acrylate, and 0.75 percent of a methacrylic acid-2-hydroxy ethyl ethyleneimine reaction product, 10 parts of methyl 12-hydroxystearate and 46 parts of a solvent solution comprising 40 percent toluene, 32 percent VM&P naphtha, 20 percent methyl ethyl ketone, and 8 percent xylene.

The resulting lacquer had excellent gloss and coating pattern when coated onto a panel.

EXAMPLE 3

A solution of acrylic polymer lacquer was prepared as follows:

A pigment paste was formed comprising 25.2 parts of a pigment blend comprising 75.8 percent aluminum, 19 percent phthalo-blue pigment and 5.2 percent maroon pigment, 12.3 parts of an interpolymer comprising 78.7 percent methylmethacrylate, 19.8 percent butyl methacrylate and 1.5 percent 2-(2-hydroxyethylamino) ethyl methacrylate and 62.5 parts of toluene.

A solution acrylic lacquer was prepared by 8 parts of the above paste to 147 parts of an interpolymer of 94.25 percent methylmethacrylate, 5 percent 2-ethylhexyl acrylate and 0.75 percent of a methacrylic acid-2-hydroxyethyl ethyleneimine, 52 parts of an interpolymer of 74.25 percent methylmethacrylate, 25 percent 2-ethylhexyl acrylate and 0.7% of the reaction product of methacrylic acid and 2-hydroxyethyl ethyleneimine, 5 parts of methyl 12-hydroxystearate, 12 parts of plasticizer comprising 43.1 percent coconut oil, 5.8 percent glycerol phthalate, 48.8 percent ethylene glycol phthalate and 2.3 percent ethylene glycol, 7 parts of a 30 percent solution of 4-dodecyloxy 2-hydroxybenzophenone in toluene, 2 parts of a 1 percent solution of silicone in toluene and 10 parts of a solvent solution of 40 percent toluene, 32 percent VM&P naphtha, 20 percent methyl ethyl ketone and 8 percent xylene.

The above lacquer was reduced by adding a like amount of a composition comprising 60 percent toluene, 25 percent Cellosolve acetate and 15 percent VM&P naphtha to the lacquer.

The above prepared acrylic lacquer was compared to an acrylic lacquer which does not contain the methyl 12-hydroxystearate additive and was prepared in exactly the same manner, except that the acrylic lacquer contained 157 parts of the 94.25 percent methylmethacrylate interpolymer, 54 parts of the 94.25 percent methylmethacrylate interpolymer and 3 parts of the solvent solution with no methyl 12-hydroxystearate.

Both acrylic lacquer solutions were sprayed on display panels and it was found that the lacquer containing the methyl, 12-hydroxystearate additive had excellent gloss and orientation and did not solvent pop (solvent pops through film of coating when baked). The lacquer containing no methyl 12-hydroxystearate additive solvent popped and was badly mottled (poor metallic orientation).

According to the provisions of the patent statutes, there is described above the invention and what are now considered to be its best embodiment. However, within the scope of the appended claims, it is to be understood that the invention can be practiced otherwise than as specifically described.

I claim:

1. An acrylic lacquer comprising an acrylic polymer and from about 2 to about 15 percent by weight of methyl 12-hydroxystearate based on the weight of the acrylic polymer.

2. The lacquer of claim 1 additionally comprising an external plasticizer for the acrylic polymer.

3. The lacquer of claim 2 comprising from about 5 percent to about 35 percent by weight of external plasticizer based on the weight of acrylic polymer and about 2 percent to about 15 percent by weight of methyl 12-hydroxystearate based on the weight of the acrylic polymer.

4. The lacquer of claim 1 wherein the acrylic polymer and methyl 12-hydroxystearate are in a solution with a solvent for the acrylic polymer.

5. The acrylic lacquer of claim 4 wherein the solvent for the acrylic polymer comprises toluene.

6. The lacquer of claim 3 wherein the plasticizer is butyl benzyl phthalate.

7. The lacquer of claim 3 wherein the plasticizer is 2,2,4-trimethyl-1,3-pentanediol dibenzoate.

8. The lacquer of claim 1 wherein the acrylic polymer is poly (methyl methacrylate).

9. The lacquer of claim 1 wherein the acrylic polymer is an interpolymer of acrylic monomers.

No references cited.

MORRIS LIEBMAN, Primary Examiner

P. R. MICHL, Assistant Examiner

U.S. Cl. X.R.

260—31.6